(12) United States Patent
Ohno

(10) Patent No.: US 9,368,125 B2
(45) Date of Patent: Jun. 14, 2016

(54) SYSTEM AND ELECTRONIC EQUIPMENT FOR VOICE GUIDANCE WITH SPEED CHANGE THEREOF BASED ON TREND

(71) Applicant: Renesas Electronics Corporation, Kawasaki-shi, Kanagawa (JP)

(72) Inventor: Kazuyuki Ohno, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 297 days.

(21) Appl. No.: 13/972,959

(22) Filed: Aug. 22, 2013

(65) Prior Publication Data

US 2014/0074482 A1 Mar. 13, 2014

(30) Foreign Application Priority Data

Sep. 10, 2012 (JP) .................................. 2012-198307

(51) Int. Cl.
| | | |
|---|---|---|
| *G10L 21/047* | (2013.01) | |
| *H04N 21/482* | (2011.01) | |
| *G10L 21/06* | (2013.01) | |
| *G10L 13/04* | (2013.01) | |
| *G06F 3/16* | (2006.01) | |
| *G10L 13/033* | (2013.01) | |

(52) U.S. Cl.
CPC ................ *G10L 21/06* (2013.01); *G06F 3/167* (2013.01); *G10L 13/04* (2013.01); *G10L 13/033* (2013.01); *G10L 21/047* (2013.01); *H04N 21/482* (2013.01)

(58) Field of Classification Search
CPC ....... G10L 13/00; G10L 13/33; G10L 21/043; H04N 21/482
USPC .................. 704/260, 267, 271, 275; 386/297
See application file for complete search history.

(56) References Cited

U.S. PATENT DOCUMENTS

| | | | | | |
|---|---|---|---|---|---|
| 5,493,608 | A | * | 2/1996 | O'Sullivan ................. | 379/88.04 |
| 5,553,121 | A | * | 9/1996 | Martin et al. .............. | 379/88.01 |
| 5,652,828 | A | * | 7/1997 | Silverman ..................... | 704/260 |
| 5,991,724 | A | * | 11/1999 | Kojima et al. ................ | 704/266 |
| 6,546,367 | B2 | * | 4/2003 | Otsuka .......................... | 704/260 |
| 6,757,362 | B1 | * | 6/2004 | Cooper et al. ............. | 379/88.01 |
| 2003/0020760 | A1 | | 1/2003 | Takatsu et al. | |
| 2003/0036909 | A1 | * | 2/2003 | Kato ............................. | 704/275 |
| 2003/0046233 | A1 | * | 3/2003 | Ara et al. ........................ | 705/43 |

(Continued)

FOREIGN PATENT DOCUMENTS

| | | | | | |
|---|---|---|---|---|---|
| JP | 05227290 | A | * | 9/1993 | ............. H04M 3/42 |
| JP | 2003-323081 | A | | 11/2003 | |
| JP | 2008-039623 | A | | 2/2008 | |

*Primary Examiner* — James Wozniak

(74) *Attorney, Agent, or Firm* — Shapiro, Gabor and Rosenberger, PLLC

(57) ABSTRACT

A voice guidance system is provided in which the voice guidance is enabled to easily follow a trend of change intervals, a rapid change of change intervals, etc. in a menu operation. The voice guidance system is configured with an input analyzing unit which inputs and analyzes an operation instruction signal of a menu item, a voice guidance control unit which controls voice guidance of the menu item according to the analysis result by the input analyzing unit, and a textual guidance control unit which performs display control of the menu item according to the analysis result by the input analyzing unit. The voice guidance control unit determines reproduction speed of the voice guidance according to the analysis result, on the basis of a speed trend obtained from a speed history as a set of plural pieces of reproduction speed information.

17 Claims, 11 Drawing Sheets

(56) References Cited

U.S. PATENT DOCUMENTS

| | | | |
|---|---|---|---|
| 2004/0193423 A1* | 9/2004 | Nagae et al. | 704/266 |
| 2005/0149329 A1* | 7/2005 | Elshafei | 704/266 |
| 2005/0228672 A1* | 10/2005 | Lewis et al. | 704/260 |
| 2006/0020472 A1* | 1/2006 | Mitsui | 704/275 |
| 2007/0047515 A1* | 3/2007 | Jonsson et al. | 370/352 |
| 2007/0094029 A1* | 4/2007 | Saito et al. | 704/260 |
| 2007/0094033 A1* | 4/2007 | Nagashima et al. | 704/272 |
| 2007/0100628 A1* | 5/2007 | Bodin | G10L 13/033 704/261 |
| 2007/0171788 A1* | 7/2007 | Yokoyama et al. | 369/47.16 |
| 2010/0057464 A1* | 3/2010 | Kirsch et al. | 704/260 |
| 2010/0082349 A1* | 4/2010 | Bellegarda et al. | 704/260 |
| 2010/0191533 A1* | 7/2010 | Toiyama et al. | 704/260 |
| 2011/0276329 A1* | 11/2011 | Ayabe et al. | 704/243 |
| 2012/0197645 A1* | 8/2012 | Nakamae | 704/258 |
| 2013/0337786 A1* | 12/2013 | Park | 455/414.1 |

* cited by examiner

FIG. 11

| ELAPSED TIME | VOICE OUTPUT | COMMAND INPUT | OPERATION |
|---|---|---|---|
| START | | | SELECT "PARENTAL CONTROL" |
| 0.1 SECONDS | "Pa" | | |
| 0.2 SECONDS | "Re" | | |
| 0.3 SECONDS | "N" | | |
| 0.4 SECONDS | "Ta" | | |
| 0.5 SECONDS | "L" | | |
| 0.6 SECONDS | " " | | |
| 0.7 SECONDS | "Con" | | |
| 0.5 SECONDS | "T" | | |
| 0.6 SECONDS | "Ro" | | |
| 0.7 SECONDS | "L" | | |
| 0.8 SECONDS | | | |
| 0.9 SECONDS | | | |
| 1.0 SECOND | | CURSOR MOVEMENT COMMAND IS RECEIVED | |
| 1.1 SECONDS | "Se" | | MOVE CURSOR TO "SETUP" AND SELECT |
| 1.2 SECONDS | "T" | | |
| 1.3 SECONDS | " " | | |
| 1.3 SECONDS | "U" | | |
| 1.4 SECONDS | "p" | | |

(CURSOR MOVES FROM "PARENTAL CONTROL" TO "SETUP" AT SUFFICIENT INTERVAL)

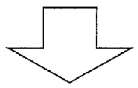

CASE OF CURSOR MOVING FROM "PARENTAL CONTROL" TO "SETUP"

| ELAPSED TIME | VOICE OUTPUT | COMMAND RECEPTION | OPERATION |
|---|---|---|---|
| START | | | SELECT "PARENTAL CONTROL" |
| 0.1 SECONDS | "Pa" | | |
| 0.2 SECONDS | "Re" | | |
| 0.3 SECONDS | "N" | CURSOR MOVEMENT COMMAND IS RECEIVED | |
| 0.4 SECONDS | "TaLCon" | | CHANGE OUTPUT VOICE TO FAST HEARING DATA |
| 0.5 SECONDS | "tRol" | | MOVE CURSOR TO "SETUP" AND SELECT |
| 0.6 SECONDS | "Set" | | |
| 0.7 SECONDS | "Up" | | |

(CURSOR MOVES FROM "PARENTAL CONTROL" TO "SETUP" IN MIDDLE OF TEXT-TO-SPEECH)

SYSTEM AND ELECTRONIC EQUIPMENT FOR VOICE GUIDANCE WITH SPEED CHANGE THEREOF BASED ON TREND

CROSS-REFERENCE TO RELATED APPLICATIONS

The disclosure of Japanese Patent Application No. 2012-198307 filed on Sep. 10, 2012 including the specification, drawings and abstract is incorporated herein by reference in its entirety.

BACKGROUND

The present invention relates to a voice guidance system and electronic equipment employing the same, and relates to technique to be effectively applied to a television set, etc. which can perform voice guidance to the operation instruction of a menu item by means of a remote controller, etc.

For the benefit of a visually-impaired person or the like, technique is provided for guiding with voice the contents of an operation command to electronic equipment, such as a television set, a DVD player, a copying machine, or a printer. Patent Literature 1 discloses a device in which setting items of operation items of the device are arranged as a hierarchical menu of hierarchical structure, and a desired setting item in the hierarchy is pointed with a cursor key and selected with a determining key. This device is configured so as to notify an operation instruction and its result by means of a sound icon, an operation sound, and a voice, with different attributes of the sound according to a situation. Accordingly, it becomes possible to operate the device, easily and reliably, without employing visual sense.

With respect to voice guidance, Patent Literature 2 discloses technique on speech peed control of the voice guidance in a navigation device. That is, when there is no time margin for performing voice guidance relative to pass time required for a practical vehicle to pass through between the points under the route guidance, the present technique performs control so as to accelerate the speech speed of the voice guidance.

(Patent Literature 1) Published Japanese Unexamined Patent Application No. 200332-323081

(Patent Literature 2) Published Japanese Unexamined Patent Application No. 2008-39623

SUMMARY

The present inventors have examined the technique which performs voice guidance of instruction contents in a menu operation performed with a remote controller, etc. In particular, it is estimated that when the next operation is performed before the current voice guidance is completed, the current voice guidance will be interrupted and become difficult to be recognized. In order to avoid such a situation, it will be possible to set specifications which forbid acceptance of a new menu operation until the voice guidance is completed without interruption. However, setting such specifications will worsen the response of the menu operation too much.

With reference to Patent Literature 2, the present inventors have examined that the reproduction speed of voice guidance will be increased in order to cope with a fast change of a menu operation. However, even if the reproduction speed of voice guidance is increased, the voice guidance will be interrupted similarly, depending on the change interval of operation, and conversely, when the change interval of operation becomes long after setting the increased reproduction speed, the voice guidance will sound like an out-of-time performance. In order to facilitate visually-impaired person's convenience in particular, it is important to make the voice guidance follow as much as possible a trend, a rapid change, etc. of the change interval of menu operation, thereby preventing easy interruptions of the voice guidance in progress.

The above and other subjects and new features will become clear from description of the specification and the accompanying drawings of the present invention.

The following explains briefly an outline of typical embodiments to be disclosed by the present application.

That is, the reproduction speed of the voice guidance according to the analysis result of an inputted operation instruction signal of a menu item is determined on the basis of the speed trend obtained from speed history which is a set of plural pieces of reproduction speed information.

The following explains briefly an effect obtained by the typical embodiments to be disclosed in the present application.

That is, it becomes easy to make the voice guidance follow a trend, a rapid change, etc. of the change interval of the menu operation.

BRIEF DESCRIPTION OF THE DRAWINGS

FIG. 11 is an explanatory diagram illustrating an example in which speech speed is increased in the middle of voice guidance and voice follows the movement of a cursor

DETAILED DESCRIPTION

1. Outline of Embodiments

Figure 1:
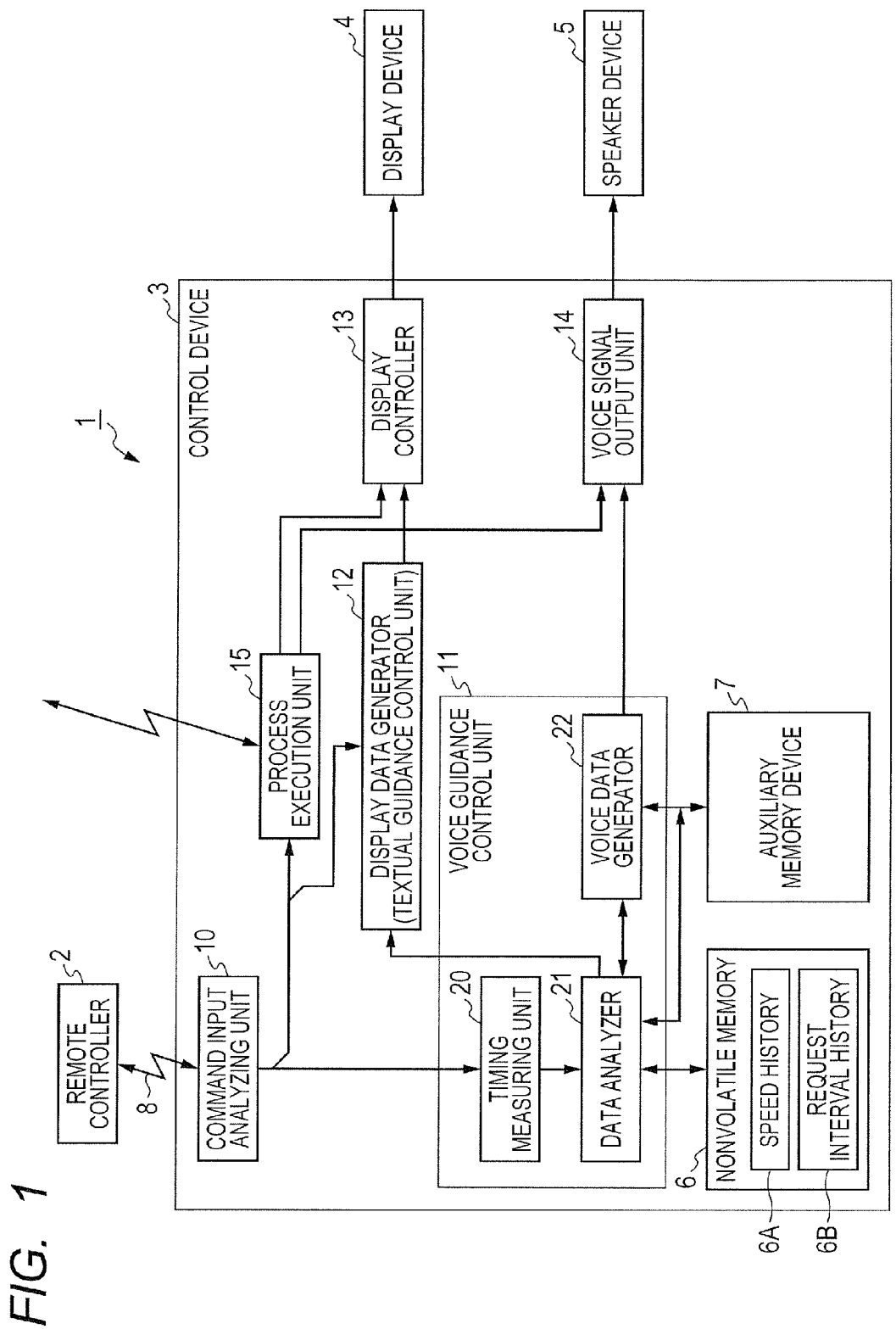
FIG. 1 is a block diagram illustrating an example of electronic equipment to which a voice guidance system is applied.

First, an outline of a typical embodiment disclosed in the present application is explained. A numerical symbol of the drawing referred to in parentheses in the outline explanation about the typical embodiment only illustrates what is included in the concept of the component to which the numerical symbol is attached.

(1) <Determination of the Reproduction Speed of Voice Guidance on the Basis of its History Information>

A voice guidance system according to a typical embodiment is configured with an input analyzing unit (10), a voice guidance control unit (11), and a textual guidance control unit (12), as illustrated in FIG. 1. The input analyzing unit (10) inputs and analyzes an operation instruction signal (8) of a menu item. The voice guidance control unit (11) controls voice guidance of the menu item according to the analysis result by the input analyzing unit. The textual guidance control unit (12) performs display control of the menu item according to the analysis result by the input analyzing unit. The voice guidance control unit determines reproduction speed of the voice guidance according to the analysis result, on the basis of a speed trend obtained from a speed history (6A) as a set of plural pieces of reproduction speed information (S52).

According to the present device, the reproduction speed of the voice guidance is determined on the basis of the speed trend obtained from plural pieces of reproduction speed information held by the speed history (6A). Therefore, it is possible to reduce the influence of a trend of the change interval, a rapid change of the change interval, etc. of a menu operation, and it becomes easy to make the voice guidance follow such a change.

(2) <Increase of the Reproduction Speed in the Case of a New Operation Instruction Being Issued in the Middle of Reproduction of the Voice Guidance>

In the voice guidance system according to Paragraph 1, when a new operation instruction of the menu item is issued in the middle of reproduction of the voice guidance, the voice guidance control unit increases the reproduction speed in the middle of reproduction within the highest speed (S53-S58, S24-S31, T3b).

According to the present device, it is possible to promptly increase the reproduction speed even in the middle of the voice guidance when a new operation instruction of the menu item is issued. Therefore, it is possible to realize the speed increase prior to the speed increase of the next voice guidance by the speed history.

(3) <A Case Where a New Operation Instruction of a Menu Item is Issued in the Middle of Reproduction of the Voice Guidance>

In the voice guidance system according to Paragraph 2, when a new operation instruction of the menu item is issued in the middle of reproduction of the voice guidance, the voice guidance control unit enables addition of the increased reproduction speed information to the speed history (S37).

According to the present device, the increased reproduction speed information is added to the speed history corresponding to an operating condition in which the menu item has been changed quickly rather than immediately before. Accordingly, it is possible to reflect the fast changing trend of the menu item to the determination of the next reproduction speed.

(4) <A Case Where the Period During Which the Voice Guidance of a Menu Item is Stopped Exceeds a Prescribed Period>

In the voice guidance system according to Paragraph 3, when the period during which the voice guidance of the menu item is stopped exceeds a prescribed period, the voice guidance control unit enables addition of decreased reproduction speed information to the speed history (S39-341, S37).

According to the present device, the decreased reproduction speed information is added to the speed history corresponding to the state where no operation of the menu item is performed for a certain time. Accordingly, it is possible to reflect the slow changing trend of the menu item to the determination of the next reproduction speed.

(5) <Determination of Reproduction Speed by Use of a Weighted Average with Larger Weight Allotted to New Reproduction Speed Information>

In the voice guidance system according to one of Paragraph 1 through Paragraph 4, the voice guidance control unit determines the reproduction speed of the present voice guidance by a weighted average which allots larger weight to new reproduction speed information rather than old reproduction speed information, in adding to the speed history (S52).

According to the present device, it is possible to determine the reproduction speed of the voice guidance by attaching importance to the speed trend of the latest menu operation, and it is possible to perform the voice guidance without deviating from the trend of the latest menu operation, suppressing an extreme change of the voice guidance speed.

(6) <Invalidation of a New Operation Instruction Issued in the Middle of Reproduction of the Voice Guidance>

In the voice guidance system according to Paragraph 5, when a new operation instruction of the menu item is issued in the middle of reproduction of the voice guidance at the presently determined reproduction speed, the voice guidance control unit invalidates the request of the new operation instruction concerned (S53, S2, S4).

According to the present device, it is possible to ignore the invalidated operation instruction; accordingly, the control of the voice guidance becomes simple on the whole.

(7) <Response to the Case of an Operation Instruction Continuing at a Short Interval>

In the voice guidance system according to Paragraph 2, when a new operation instruction of the menu item is issued in the middle of reproduction of the voice guidance at the presently determined reproduction speed, the voice guidance control unit updates speech speed mode data which determines the reproduction speed in the middle of reproduction to a value which, increases the reproduction speed in the middle of reproduction by one step (S50, S53, S54). Together with this, when a mean value of the request interval is obtained from a request interval history as a set of the interval time at which the voice guidance of the menu item has been requested by an operation instruction signal of the menu item, and when the mean value of the request interval is shorter than the remaining time of the voice guidance in the middle of reproduction, the voice guidance control unit increases the reproduction speed in the middle of reproduction within the highest speed, through the processing for updating the speech speed mode data to a value which increases the reproduction speed by one more step (S54-S57, S58).

When the change operation of the menu item is frequently performed during the voice guidance, it is expected that the change operation of the menu item is performed at a similarly short interval even if the voice guidance concerned is completed. According to the present device, however, it is possible to respond such a case. This is because, even if the change operation of the menu item is frequently performed at a short interval during the voice guidance, the operation trend is added to the speed history. If it is assumed that each request interval time of the request interval history becomes shorter in particular, due to the operation instruction of a new menu item issued repeatedly at a short interval in the middle of the text-to-speech process, the present text-to-speech process cannot be completed within a mean time of the request interval concerned when the mean time of the request interval is shorter than the remaining reproduction time. Therefore, the increase of the next speech speed can be coped with by updating the speech speed mode data to a fast speed trend towards further speed enhancement.

(8) <Utilization of the Mode Information of a Reproduction Speed as Information of the Reproduction Speed>

In the voice guidance system according to Paragraph 7, the reproduction speed information to be stored in the speed history is the speech speed mode data.

According to the present device, the management of the speed history becomes easier by employing the speech speed mode data as the reproduction speed information rather than employing the reproduction speed itself.

(9) <Change of the Reproduction Speed Towards the Reference Speed in the Case of Interruption of an Operation Instruction in a Short Interval>

In the voice guidance system according to Paragraph 7, when the period during which the voice guidance of the menu item is stopped exceeds a prescribed period, the voice guidance control unit adds, to the speed history, reproduction speed information which indicates the reproduction speed less than that of the immediately preceding reproduction speed information and greater than a reference speed, on condition that the immediately preceding reproduction speed is greater than the reference speed (S39-S41).

According to the present device, it is possible to enjoy the same operation-effect as in Paragraph 4. In particular, it is assured that the reproduction speed information added to the speed history is greater than the reference speed. Therefore, even if there is no employment for long time, the reproduction speed of the voice guidance is not decreased less than the reference speed.

(10) <Utilization of the Mode Information Reproduction Speed as Information of the Reproduction Speed>

In the voice guidance system according to Paragraph 9, the reproduction speed information to be stored in the speed history is the speech speed mode data which determines the reproduction speed.

According to the present device, the management of the speed history becomes easier by employing the speech speed mode data as the reproduction speed information rather than employing the reproduction speed itself.

(11) <Increase of the Reproduction Speed by Omitting a Repeated Waveform Portion of the Reference Speed Voice Data>

In the voice guidance system according to Paragraph 1, the voice guidance control unit analyzes the voice data at a reference speed which is employed for the voice guidance of the menu item according to the analysis result of the operation instruction signal, grasps a repeated waveform portion (T3*a*, S61), and generates the voice data to be employed for the voice guidance by omitting a repeated waveform portion by the necessary amount to satisfy the presently determined reproduction speed (T3*a*, S63).

According to the present device, the speech frequency does not change depending on the reproduction speed, accordingly, it is easy to realize favorable sound quality, compared with the case where the reproduction data is prepared by compressing and decompressing the entire voice data according to speed. What is necessary is just to prepare the reference speed voice data, and it is not necessary to hold the voice data for every voice reproduction speed.

(12) <Voice Data in the Case of Changing Speed in the Middle of Reproduction>

In the voice guidance system according to Paragraph 11, when a new operation instruction of the menu item is issued in the middle of reproduction of the voice guidance, the voice guidance control unit increases the reproduction speed from the middle of the menu item under reproduction, by changing a portion of the subsequent reproduction to voice data in which the repeated waveform portion is furthermore omitted (S24-S31, T3*b*).

According to the present device, it is possible to promptly increase the reproduction speed even in the middle of the voice guidance when a new operation instruction of the menu item is issued. Therefore, it is possible to realize the speed increase prior to the speed increase of the next voice guidance by the speed history.

(13) <Acquisition of Reference Speed Voice Data from a Storage Device>

In the voice guidance system according to Paragraph 12, the voice guidance control unit holds the reference speed voice data in a storage device for individual voice guidance, and acquires the reference speed voice data employed for the analysis from the storage device.

According to the present device, it is not necessary to acquire the reference speed voice data from the exterior.

(14) <Switching of Display of the Corresponding Menu Item in Synchronization with Completion of the Voice Guidance>

In the voice guidance system according to Paragraph 1, the textual guidance control unit switches the display to the corresponding menu item in synchronization with completion of the voice guidance.

According to the present device, it is possible to easily prevent the occurrence of a discrepancy between the voice guidance and the menu display.

(15) <Determination of the Reproduction Speed of the Voice Guidance on the Basis of the History Information Thereof>

Electronic equipment according to another embodiment is configured with a control device (3), a display device (4), and a speaker device (5), as illustrated in FIG. 1. The control device (3) inputs an operation instruction from an operating device and responds to the operation instruction. The display device (4) inputs a picture signal outputted from the control device. The speaker device (5) inputs an audio signal outputted from the control device. The control device is configured with an input analyzing unit (10), a voice guidance control unit (11), a textual guidance control unit (12), and an execution control unit (15). The input analyzing unit (10) inputs and analyzes an operation instruction signal of a menu item from the operating device. The voice guidance control unit (11) performs voice guidance of the menu item according to the operation instruction using the speaker device, on the basis of the analysis result by the input analyzing unit. The textual guidance control unit (12) displays the menu item according to the operation instruction using the display device, on the basis of the analysis result by the input analyzing unit. The execution control unit (15) performs processing of the menu item instructed by the operation instruction, on the basis of the analysis result by the input analyzing unit. The voice guidance control unit determines reproduction speed of the voice guidance according to the analysis result, on the basis of a speed trend obtained from a speed history as a set of plural pieces of reproduction speed information.

According to the pre sent device, the reproduction speed of the voice guidance is determined on the basis of the speed trend obtained from plural pieces of reproduction speed information held by the speed history (6A). Therefore, it is possible to reduce the influence of a trend of the change interval, a rapid change of the change interval, etc. of a menu operation, and it becomes easy to make the voice guidance follow such a change. It is possible to provide a visually-impaired person and others with the convenience about the menu operation of the electronic equipment.

(16) <Increase of the Reproduction Speed in the Case of a New Operation Instruction Being Issued in the Middle of Reproduction of the Voice Guidance>

In the electronic equipment according to Paragraph 15, when a new operation instruction of the menu item is issued in the middle of reproduction of the voice guidance, the voice guidance control unit increases the reproduction speed in the middle of reproduction within the highest speed.

According to the present device, it is possible to promptly increase the reproduction speed even in the middle of the voice guidance when a new operation instruction of the menu item is issued. Therefore, it is possible to realize the speed increase prior to the speed increase of the next voice guidance by the speed history.

(17) <A Case Where a New Operation Instruction of a Menu Item is Issued in the Middle of Reproduction of the Voice Guidance>

In the electronic equipment according to Paragraph 16, when a new operation instruction of the menu item is issued in the middle of reproduction of the voice guidance, the voice guidance control unit enables addition of the increased reproduction speed information to the speed history.

According to the present device, the increased reproduction speed information is added to the speed history corresponding to an operating condition in which the menu item has been changed quickly rather than immediately before. Accordingly, it is possible to reflect the fast changing trend of the menu item to the determination of the next reproduction speed.

(18) <A Case Where the Period During Which the Voice Guidance of a Menu Item is Stopped Exceeds a Prescribed Period>

In the electronic equipment according to Paragraph 17, when the period during which the voice guidance of the menu item is stopped exceeds a prescribed period, the voice guidance control unit enables addition of decreased reproduction speed information to the speed history.

According to the present device, the decreased reproduction speed information is added to the speed history corresponding to the state where no operation of the menu item is performed for a certain time. Accordingly, it is possible to reflect the slow changing trend of the menu item to the determination of the next reproduction speed.

(19) <Response to the Case of an Operation Instruction Continuing at a Short Interval>

In the electronic equipment according to Paragraph 18, when a new operation instruction of the menu item is issued in the middle of reproduction of the voice guidance at the presently determined reproduction speed, the voice guidance control unit updates speech speed mode data which determines the reproduction speed in the middle of reproduction to a value which increases the reproduction speed in the middle of reproduction by one step (S50, S53, S54). Together with this, when a mean value of the request interval is obtained from a request interval history as a set of the interval time at which the voice guidance of the menu item has been requested by an operation instruction signal of the menu item, and when the mean value of the request interval is shorter than the remaining time of the voice guidance in the middle of reproduction, the voice guidance control unit increases the reproduction speed in the middle of reproduction within the highest speed (S24-S31), through the processing for updating the speech speed mode data to a value which increases the reproduction speed by one more step (S54-S57).

When the change operation of the menu item is frequently performed during the voice guidance, it is expected that the change operation of the menu item is performed at a similarly short interval even if the voice guidance concerned is completed. According to the present device, however, it is possible to respond such a case. This is because, even if the change operation of the menu item is frequently performed at a short interval during the voice guidance, the operation trend is added to the speed history. If it is assumed that each request interval time of the request interval history becomes shorter in particular, due to the operation instruction of a new menu item issued repeatedly at a short interval in the middle of the text-to-speech process, the present text-to-speech process cannot be completed within a mean time of the request interval concerned when the mean time of the request interval is shorter than the remaining reproduction time. Accordingly, it is possible to cope with the increase of the next speech speed, by updating the speech speed mode data to a fast speed trend towards further speed enhancement.

(20) <Change of the Reproduction Speed Towards the Reference Speed in the Case of Interruption of an Operation Instruction in a Short Interval>

In the electronic equipment according to Paragraph 19, when the period during which the voice guidance of the menu item is stopped exceeds a prescribed period, the voice guidance control unit adds, to the speed history, reproduction speed information which indicates the reproduction speed less than that of the immediately preceding reproduction speed information and greater than a reference speed, on condition that the immediately preceding reproduction speed is greater than the reference speed.

According to the present device, it is possible to enjoy the same operation-effect as in Paragraph 18. In particular, it is assured that the reproduction speed information added to the speed history is greater than the reference speed. Therefore, even if there is no employment for long time, the reproduction speed of the voice guidance is not decreased less than the reference speed.

(21) <Switching of Display of the Corresponding Menu Item in Synchronization with Completion of the Voice Guidance>

In the electronic equipment according to Paragraph 20, the textual guidance control unit switches the display to the corresponding menu item in synchronization with completion of the voice guidance.

According to the present device, it is possible to easily prevent the occurrence of a discrepancy between the voice guidance and the menu display.

2. Details of Embodiments

The embodiments are further explained in full detail.

FIG. 1 is a block diagram illustrating an example of electronic equipment to which a voice guidance system is applied. The electronic equipment 1 illustrated in FIG. 1 is configured with a control device 3 which responds to an operation instruction inputted from an operating device, for example, a wireless remote controller (hereinafter simply called a remote controller) 2, a display device 4 which inputs a picture signal outputted from the control device 3, and a speaker device 5 which inputs a voice signal outputted from the control device 3. The electronic equipment 1 is applied to a television set, an optical disk recording/reproducing device, a car navigation device, home electric appliances, etc., and the processing of responding to the operation instruction is different depending on the application. Although not restricted in particular, the operation instruction here is a selection instruction of a menu item. In the case of a television set, for example, the menu item includes a picture selection, a volume selection, a channel selection, an input-output selection, a setup, etc. In the present embodiment in particular, the menu item in responding to the operation instruction from the remote controller 2 is not only displayed on the display device 4, but also notified through the voice guidance of the menu item, i.e., through the text-to-speech of the menu item. The following explains the configuration about the voice guidance in detail.

The display device 4 is configured with an LCD display of the dot matrix type, and a speaker device 5 is configured with a stereo speaker system. The configurations of a mechanical system, a power supply system, etc. are not directly related to the present embodiment; therefore, they are not depicted in the figures.

The control device 3 is configured with devices for a circuit system of the electronic equipment 1 and peripheral devices, mounted in a circuit board. The control device 3 comprises a command input analyzing unit 10 as an input analyzing unit which inputs and analyzes a command for example, as an operation instruction signal of a menu item from the remote controller 2. The analysis result by the command input analyzing unit 10 is supplied to a voice guidance control unit 11, a display data generator 12 as a textual guidance control unit, and a process execution unit 15. Although not restricted in particular, the command input analyzing unit 10, the voice guidance control unit 11, the display data generator 12, and the process execution unit 15, are configured with a hard-wired logic circuit, respectively, or are configured with a program execution unit like a micro processing unit. When configured with the program execution unit, it is also possible to use necessary accelerators, such as a DSP, etc. at the same time, in order to ease the burden of the micro processing unit.

Although not restricted in particular, the control device 3 comprises, as a storage device, a nonvolatile memory 6 such as a flash memory to which random access is possible, and an auxiliary memory 7 such as a file memory which is configured with a hard disk or a silicon disc.

The process execution unit 15 performs control for processing of the menu item instructed by the operation instruction from the remote controller 2, on the basis of the analysis result by the command input analyzing unit 10. The present description illustrates, as a control target of the process execution unit 15, a peripheral circuit such as a display controller 13 employed also for display of the menu item and a voice signal output unit 14 employed also for voice guidance of the menu item. However, the control target is not restricted to the example. For example, in cases where the electronic equipment 1 is a television set, a TV tuner, a video interface circuit, etc. are provided. For example, in cases where the electronic equipment 1 is a television set, when a specific channel is selected with the remote controller 2, an operation instruction is supplied from the command input analyzing unit 10 to the process execution unit 15, then, the process execution unit 15 makes a television tuner (not shown) receive a broadcasting signal of the channel concerned, and supplies the received picture data to a display controller 13, and the received voice data to a voice signal output unit 14.

The display controller 13 performs the display control by drawing picture data in a frame buffer and supplying the drawn picture data to the display device 4 in synchronization with a horizontal and vertical synchronization signal. The voice signal output unit 14 is configured with a direct memory access controller (DMAC), a digital-to-analog conversion circuit (DAC), etc. The DMAC supplies sequentially to the DAC the voice data which is address-mapped in the order of outputting, and the voice signal converted into an analog signal by the DAC is supplied to the speaker device 5.

The voice guidance control unit 11 is configured with a timing measuring unit 20, a data analyzer 21, and a voice data generator 22, for example.

When the voice guidance is set up in the menu item instructed by a command as the result of the command analysis by the command input analyzing unit 10, the timing measuring unit 20 measures an interval time at which the voice guidance of the menu item is requested by the command. The measured interval time is held in the nonvolatile memory 6 as a request interval history 6B. Although not restricted in particular, the data of the interval time (the request interval time data) held as the request interval history 6B is from the newest one to the tenth newest one.

The data analyzer 21 inputs the command analysis result outputted by the command input analyzing unit 10 via the timing measuring unit 20. The data analyzer 21 refers to the nonvolatile memory 6 in which the request interval history 6B described above and the speed history 6A to be described later are stored, and refers to the auxiliary memory 7 in which various kinds of voice data of the menu item are stored. Based on the information referred to, the data analyzer 21 determines the speech speed of the menu item instructed by the command, on the basis of a speed trend obtained from the speed history 6A. The data analyzer 21 updates the request interval history 6B and the speed history 6A according to a predetermined algorithm, and realizes the learning function for performing the voice guidance at the speed suitable for the trend of the menu operation.

The voice data generator 22 performs the address mapping of the voice data in the order of reproduction in the voice data buffer, for performing the voice guidance specified by the command at the speed determined under the control of the data analyzer. The voice data after the address mapping is sequentially accessed by the voice signal output unit 14 as described above, D/A-converted, and supplied to the speaker device 5.

On the basis of the command analysis result by the command input analyzing unit 10, the display data generator 12 generates display data, in order to display the operation instruction contents sent from the remote controller 2, on the display device 4. Although not restricted in particular, the display style of the operation instruction contents may be any of the entire screen display of the display device 4, or the window screen display in parallel with the TV receive picture. Timing at which the operation instruction contents of the menu item is displayed is set after the completion of the text-to-speech of the menu item to which the operation is instructed, and the display timing is notified from the data analyzer 21.

For the voice guidance of the menu item to which the operation is instructed, the voice guidance control unit 11 performs control over the determination of the speech speed based on the speed history 6A, the speed increase of the text-to-speech in the middle of the text-to-speech process, and the learning about the operation instruction. Hereinafter, the control function described above is explained, with reference to flow charts illustrated in FIGS. 2 through 6.

Figure 2:
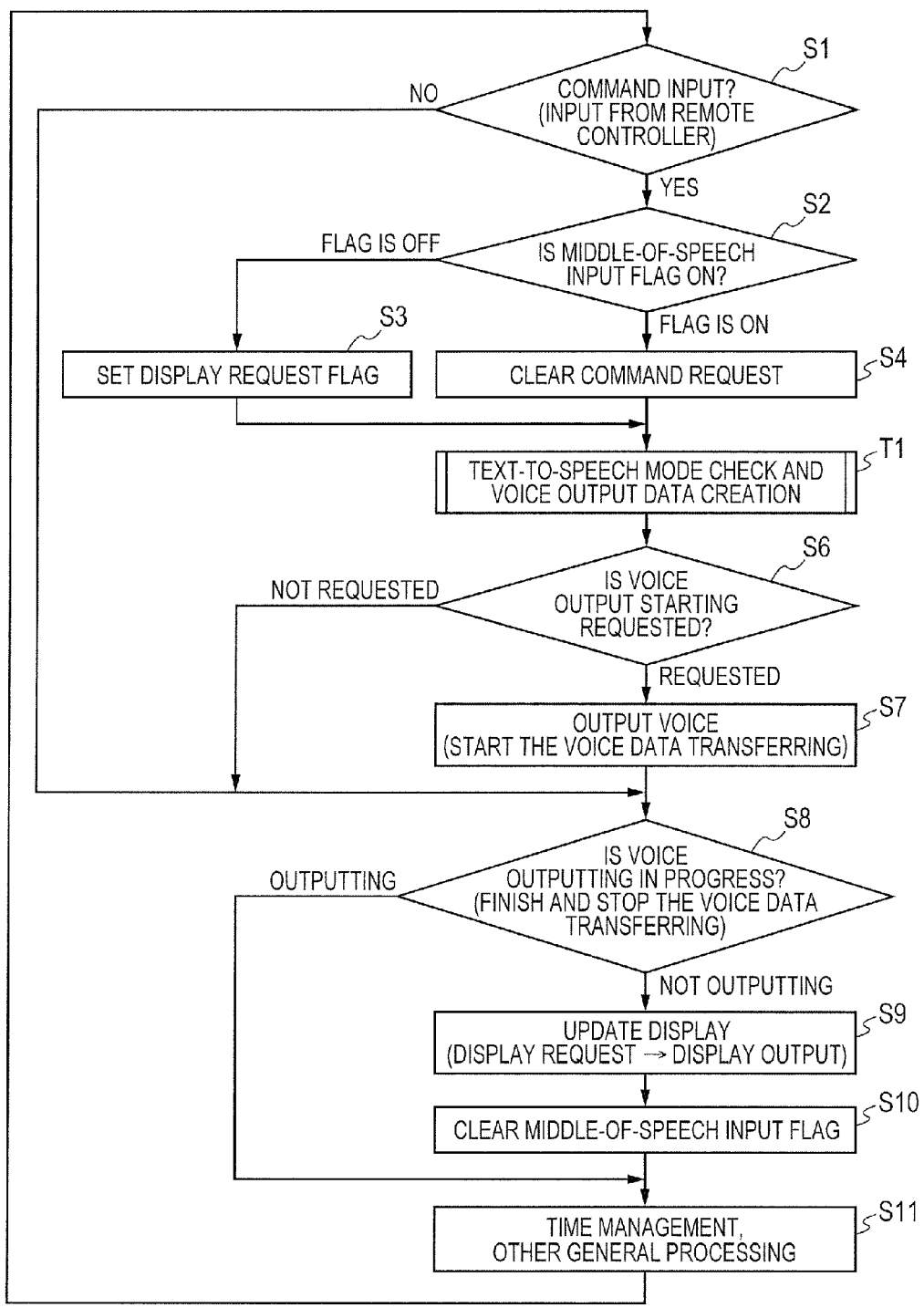
FIG. 2 is a main flowchart of the electronic equipment, illustrating control procedure of voice guidance mainly.

FIG. 2 is a main flowchart of the electronic equipment, illustrating control procedure of voice guidance mainly.

The command input analyzing unit 10 determines whether any operation instruction command of a menu item is inputted from the remote controller 2 (S1). Although not restricted in particular, the determination may start for every time-out by an interval timer. However, not restricted to the case, the control loop illustrated in FIG. 2 may be repeated without interruption as long as the operation power supply is maintained.

When it is determined that there exists a command input, it is determined whether a middle-of-speech input flag to be described later is set to ON (set state) (S2). When the middleof-speech input flag is not set to ON, a display request flag, related to the display of the menu item requested by the command input, is set to ON (S3). When the middle-of-speech input flag is set to ON, it means that the text-to-speech process of the menu item instructed by the previous command input is in progress, accordingly, the command request concerned is cleared (S4). Subsequently, the flow shifts to a speech speed mode check and voice data generation (T1). The details of the processing T1 will be described later with reference to FIG. 3 and FIG. 4.

It is determined whether a request for starting the text-to-speech process (voice output) of the menu item is issued in the processing T1 (S6). When the starting is requested, the start of DMA transfer for the voice output is instructed to the voice signal output unit 14, and the text-to-speech process of the menu item is started by the instruction (S7).

When it is determined that there is no command input at Step S1, or when it is determined that there is no voice output starting request at Step S6, or after the start of the voice output (S7), it is determined whether it is in the middle of the text-to-speech process of the menu item (whether the voice outputting is in progress) (S8). When it is not in the middle of the text-to-speech process (the text-to-speech process of the menu item is already completed), and when the display request is in the set state (S3), updating of the display to the menu item of which the text-to-speech process is completed this time is instructed, and subsequent, the display request flag is cleared (S9). Upon receiving the instruction of the updating of the display, the display data generator 12 makes the display device 4 display the menu item concerned. Next, the middle-of-speech input flag is cleared (S10).

When it is determined that it is in the middle of the text-to-speech process of the menu item at Step S8, or following Step S10, the processing other than the text-to-speech of the menu item and the display switching, for example, processing indicated by the menu item, a time managing, and other processing are performed (S11). Subsequently, the flow returns to the top step S1 to predetermined timing, and the processing described above is repeated.

Although not restricted in particular, it is assumed that all the command inputs are instructions of the menu operation, and become a text-to-speech target here. When a selection switch is provided for selecting whether to perform text-to-speech to a command input, or when it is specified for each command whether text-to-speech is accompanied or not, it is determined at the next of Step S1 whether the text-to-speech is instructed or not, and when the text-to-speech is instructed, the flow may shift to Step S2, or when not instructed, the flow may shift to the processing at Step S11.

Figure 3:
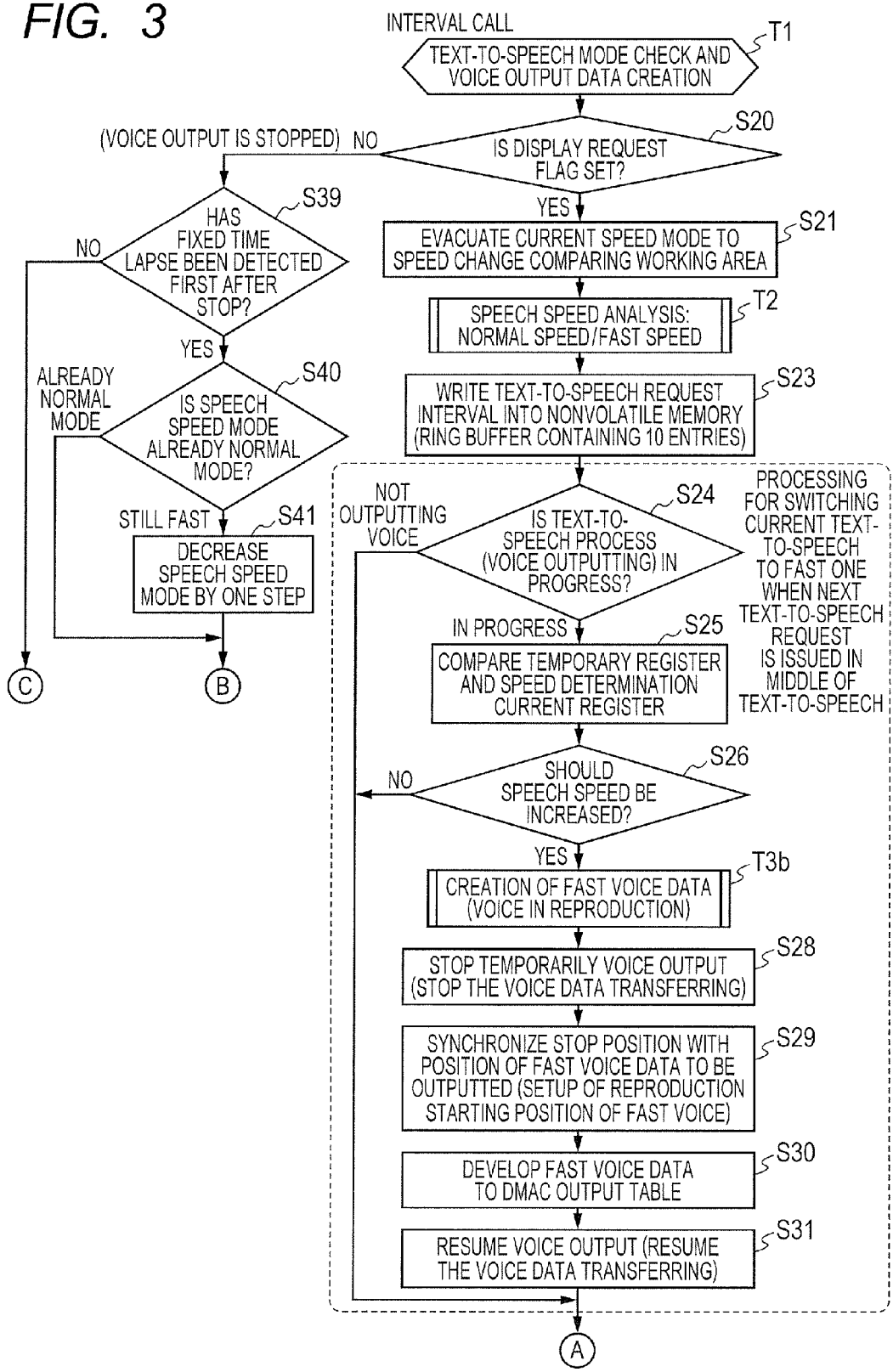
FIG. 3 is a flow chart illustrating control procedure in a first half of the speech speed mode check and voice data generation T1.
Figure 4:
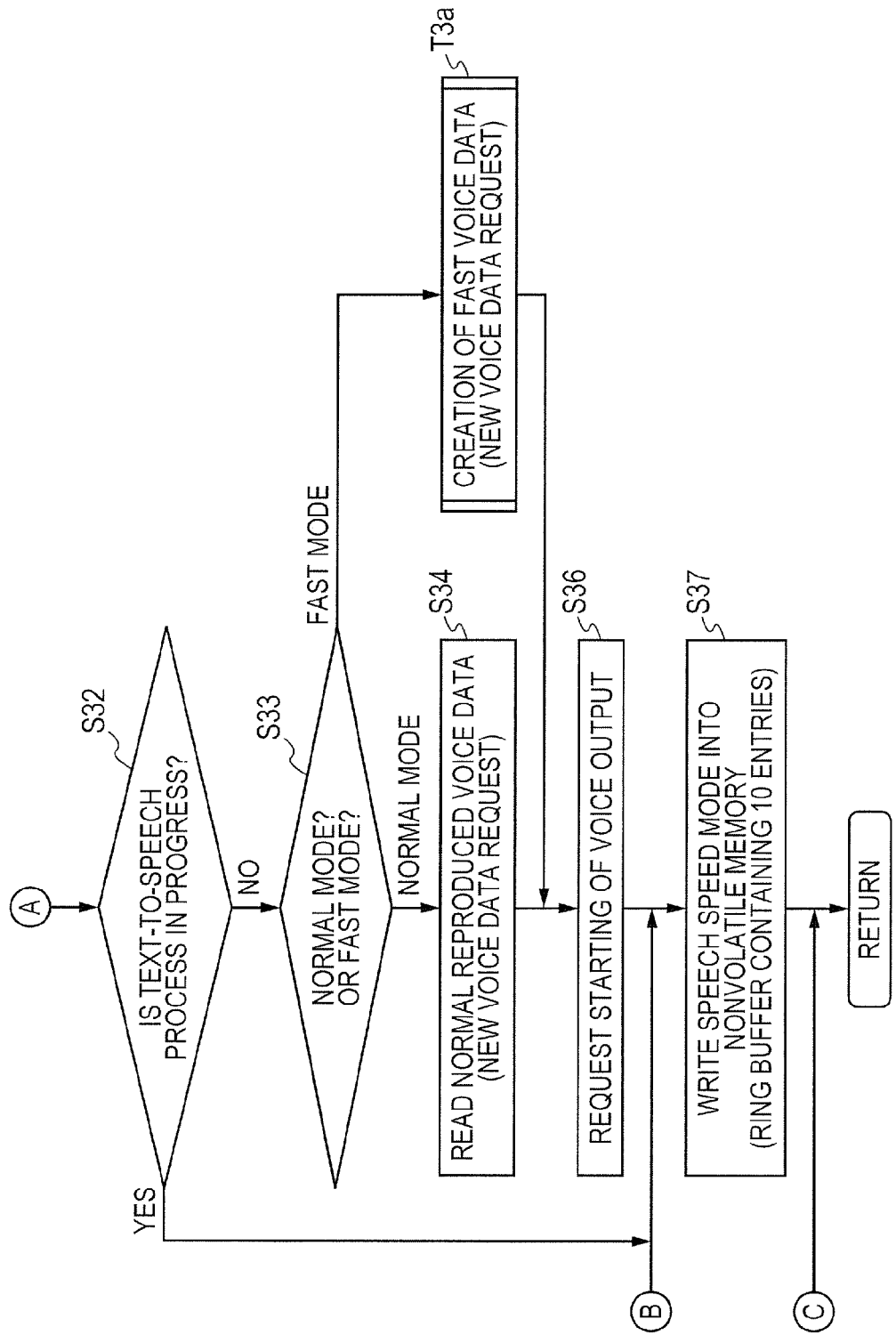
FIG. 4 is a flow chart illustrating control procedure in a second half of the speech speed mode check and voice data generation T1.

FIG. 3 and FIG. 4 illustrate control procedure of the speech speed mode check and voice data generation T1.

At the beginning, it is determined whether the display request flag is in a set state (S20). The set state of the display request flag is a state ranging after a command for instructing a new text-to-speech process is inputted until the voice guidance and display of the menu item instructed by the command concerned are completed. More specifically, the set state is a state ranging after the display request flag is set at Step S3 until the flag concerned is cleared at Step S9.

When the display request flag is in a set state, the current speech speed mode data is evacuated to a speed change comparing working area (S21). The speech speed mode data is the information for specifying the speech speed (the reproduction speed of the voice guidance) of a menu item. Subsequently, processing for determining the speech speed (normal speed/fast speed analysis of the speech speed) T2 is Performed.

Then, the request interval history 6B stored in the nonvolatile memory is updated by the operation instruction interval time of the menu item by the present command (the latest interval time at which the voice guidance of the menu item is requested by the command) (S23). As described above, ten operation instruction interval times from the newest one are stored in the request interval history 6B. Processing from Step S24 to Step S31 is for changing the present speech speed to a faster speed when the next operation instruction (text-to-speech request) is issued in the middle of the text-to-speech process. The following processing from Step S32 to Step S36 is for determining the speech speed, when it is not in the middle of the text-to-speech process. Processing from Step S38 to Step S41 is for returning the once-increased speech speed to the original speed, when an operation instruction by means of the remote controller is not issued for a prescribed period (when the change interval of the operation instruction becomes long). The speech speed mode data of the speech speed determined by these processing is written in the nonvolatile memory 6 each time to update the speed history 6A (S37). The speed history 6A holds ten pieces of the speech speed mode data from the newest one.

Figure 5:
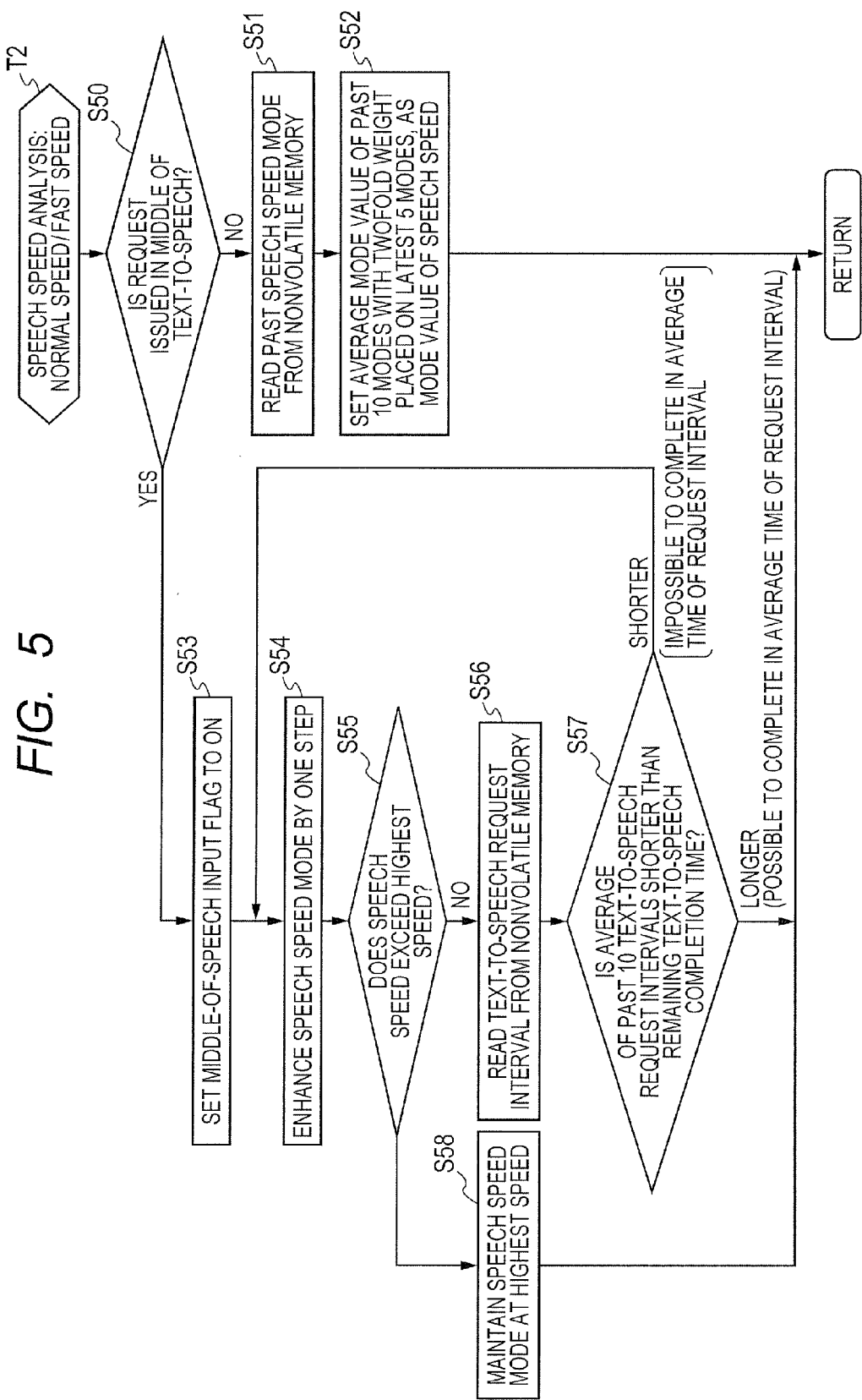
FIG. 5 is a flow chart illustrating procedure of normal-speed/fast-speed analysis of speech speed.

First, the normal speed/fast speed analysis of the speech speed T2 is explained with reference to FIG. 5. At first, it is determined whether the present command input for the voice guidance is issued in the middle of the text-to-speech process of the previous voice guidance (S50).

When the determination at Step S50 is that the present command input is not issued in the middle of the text-to-speech process, the speech speed mode data in the past is read from the speed history 6A (S51), and the present speech speed is determined on the basis of the speed trend obtained from the read speech speed mode data (S52). For example, the reproduction speed of the present voice guidance is determined by a weighted average which allots larger weight to new reproduction speed information rather than old reproduction speed information to the speed history 6A. Specifically, the speech speed is determined by averaging the past ten pieces of the speech speed mode data with twofold weight allotted to the latest five pieces of the speech speed mode data, as the present speech speed mode data. The determined speech speed mode data is stored in a temporary register, and the flow returns to the original routine. The speech speed mode data, which is first generated in response to the menu operation command and is set in the temporary register in this way, is referred to in the speed control at Step S34 or in the processing of T3. As clarified by the present explanation, the higher the speed is, the larger mode value the speech speed mode data has. In this way, it becomes easy to reflect to the speech speed the trend of the latest changing speed of the menu operation by allotting larger weight to the latest mode data.

When the determination at Step S50 is that the command input is issued in the middle of the text-to-speech process, a middle-of-speech input flag is set to ON (set) (S53), and the speech speed mode is changed to a value of increased speed by one step (S54). The speech speed mode data is set at a temporary register, for example. Furthermore, it is determined whether the speech speed of the speech speed mode data exceeds the highest speed (S55). When exceeding, the speech speed mode data in the temporary register is maintained at the value of the highest speed (S58).

When the determination result at Step S55 is that the speech speed does not exceed the highest speed, the request interval time data of the request interval history 6B is read from the nonvolatile memory 6 this time (S56), and it is determined whether the mean value of the request interval time for the past 10 times obtained from the request interval time data read this time is shorter than the remaining time of the voice guidance in the middle of reproduction (S57). In short, an assumption is made about the case where each request interval time for the past 10 times becomes short due to the operation instruction of a new menu item issued repeatedly at a short interval many times in the middle of the text-to-speech process. In such a case, the present text-to-speech process cannot be completed within a mean time of the request interval concerned when the mean value of the request interval time is shorter than the remaining reproduction time. Therefore, the expected increase of the next speech speed is coped with by updating the speech speed mode data in the temporary register to a fast speed trend towards speed increase. Therefore, when the mean value is shorter than the remaining time, the speech speed mode data is updated to a value which increases the reproduction speed by one more step (S54). When the mean value is longer than the remaining time, the flow returns to the original routine.

Next, the following explains the processing which determines the speech speed when the text-to-speech process is not in progress (Step S32 through Step S36). First, it is determined whether the text-to-speech process is in progress or not S32). When the text-to-speech process is not in progress, it is determined whether the speech speed is normal or fast (S33). The determination may be made according to the speech speed mode data which is held in the temporary register at that time, for example. For this speed determination, the speech speed mode data read from the temporary register is held in a speed determination current register. When the value of the speech speed mode data held in the speed determination current register is equal to or less than a threshold, it is determined that the speech speed is normal, otherwise, it is determined that the speech speed is fast.

When it is determined that the speech speed is normal, the reference speed voice data is read from the auxiliary memory 7 and developed for the purpose of DMA transfer (S34), and starting of the voice output is requested to the voice signal output unit 14 (S36). The present request is determined at Step S6.

When it is determined that the speech speed is fast, the fast voice data generation T3a is performed, and subsequently, starting of the voice output is requested (S36). The voice data as the generation target by the fast voice data generation T3a here is the voice data concerning a new operation request of the menu item.

Figure 6:
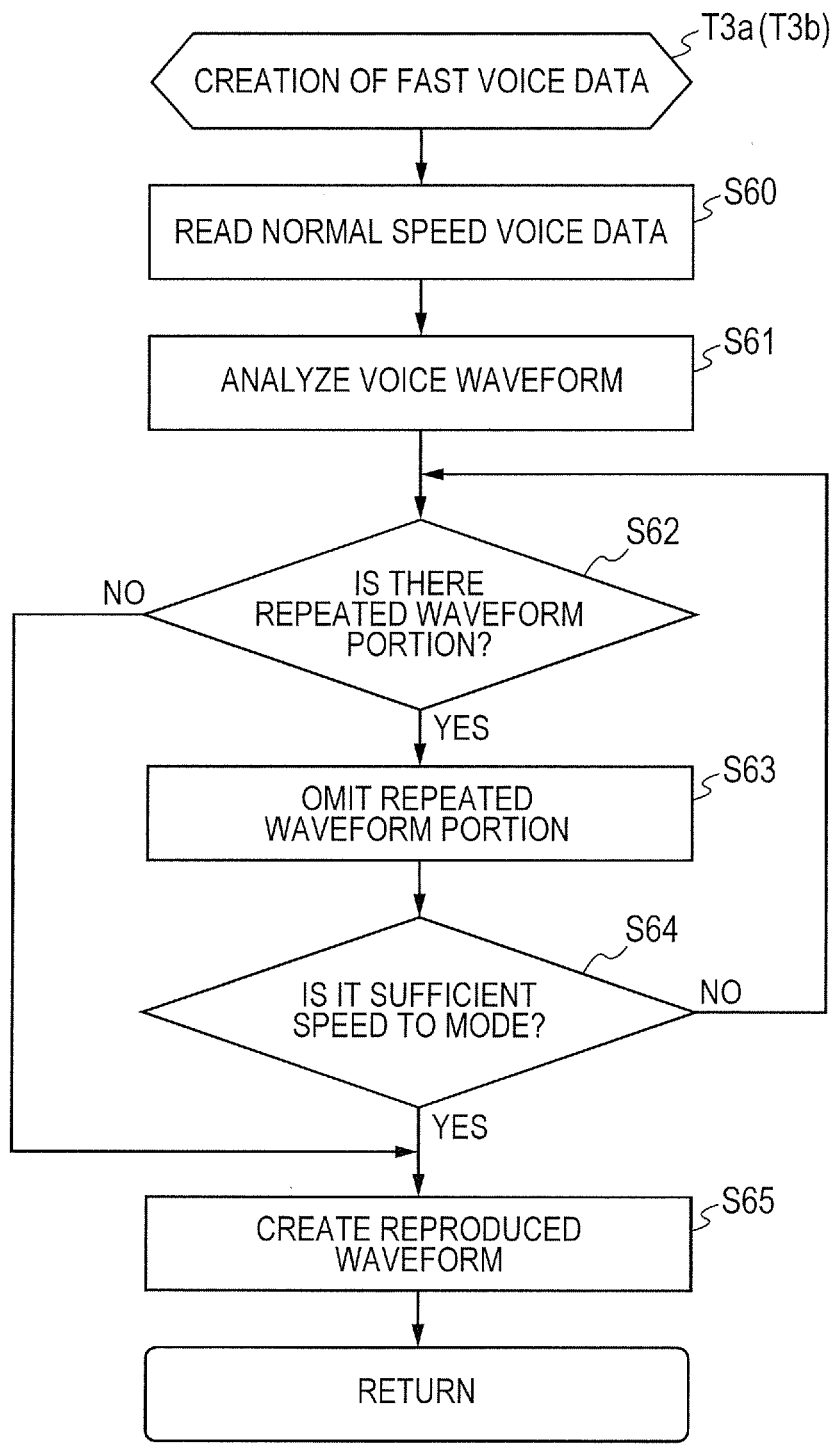
FIG. 6 is a flow chart illustrating fast voice data generation procedure.

The details of the fast voice data generation T3a are illustrated in FIG. 6. First, the reference speed voice data (normal speed voice data) is read from the auxiliary memory 7 (S60), and the voice waveform is analyzed (S61). On the basis of the analysis result, it is determined whether there exists a repeated waveform portion in the voice waveform (S62). When it is determined that there exists the repeated waveform portion, the portion is omitted (S63) to compress the data. It is determined whether the compressed data can realize the speech speed indicated by the speech speed mode data held in the speed determination current register (S64). If necessary, Step S62 through Step S64 are repeated, and the fast mode reproduced waveform data is generated (S65), then the flow returns to the original routine.

Figure 7:
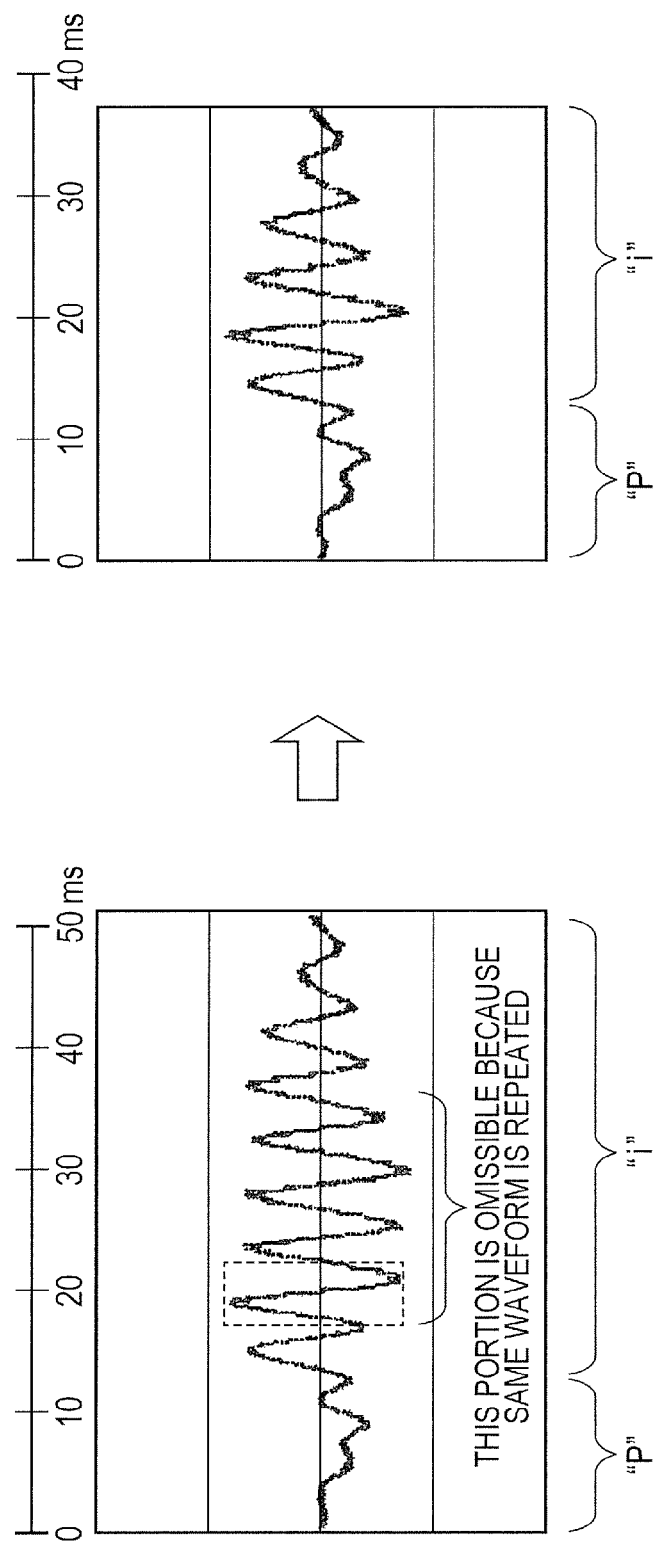
FIG. 7 is an explanatory diagram illustrating the principle of technique of data compression, by omitting a repeated portion of a voice waveform.

The principle of the technique of data compression by omitting the repeated waveform portion is illustrated in FIG. 7. Here, taking sounds of a consonant "P" and a vowel "i" as an example, the repeated waveform of the vowel "i" is omitted by necessary number of cycles. The portion to be omitted may not be restricted to a vowel but may be a consonant. It is also possible to determine a waveform to be omitted in consideration of the strength of accent, etc. In this way, when adopting the technique of omitting some waveforms to compress voice data and to reduce text-to-speech time, speech frequency does not change with a reproduction speed. Therefore, it is easy to realize favorable sound quality, compared with the case where the reproduction data is prepared by compressing and decompressing the entire voice data according to speed. What is necessary is just to prepare the reference speed voice data, and it is not necessary to hold the voice data for every voice reproduction speed.

Next, the following explains the processing of Step S24 through Step S31 illustrated in FIG. 3, that is, the processing for enhancing the current speech speed when the next operation instruction (text-to-speech request) is issued in the middle of the text-to-speech process.

At Step S24, as the subsequent processing when there exists input of the operation instruction command of the menu item (Yes at Step S1), it is determined whether the text-to-speech process of the voice guidance is in progress or not. When the text-to-speech process is in progress, the speech speed mode data which the temporary register holds in this stage and the speech speed mode data which the speed determination current register holds (corresponding to the current speech speed) are compared in value (S25). On the basis of the comparison result, it is determined whether the speed indicated by the speech speed mode data of the temporary register is fast or not, relative to the current speech speed (S26). When the speech speed mode data held in the temporary register has been increased at Step S54 etc., it is determined that the speech speed should be increased.

When it is determined that the speech speed should be increased, the new voice data is generated in the fast voice data generation T3b so that the new voice data may satisfy the speed corresponding to the speech speed mode data of the temporary register at the time. After the generation, the voice output, that is, the DMA transfer and D/A conversion of the voice data, is stopped temporarily (S28), and the synchronous position of the voice data is determined such that the voice data is coupled to the newly generated voice data at the temporarily stopped reproduction position (S29). Then, the new voice data is remapped in the work memory in the order of DMA transfer, from the synchronous position (S30). The DMA transfer and D/A conversion of the remapped voice data are resumed to predetermined timing, and the temporarily stopped voice output control is resumed (S31). The fast voice data generation T3b is the same as the fast voice data generation T3a.

Next, the following explains the processing of Step S38 through Step S41 illustrated in FIG. 3, that is, the processing for returning the speech speed once increased to the original speed when any operation instruction by means of the remote controller 2 is not issued for a prescribed period (when the change interval of the operation instruction has become long).

It is determined whether the display request flag is in a set state at Step S20. Determining in the present determination that the display request flag is not in a set state means a state where a command to perform the text-to-speech process newly is not inputted, or a state where the text-to-speech process is already completed after a command is inputted. In short, it is a time when the text-to-speech process is stopped. At this time, it is determined whether the state where fixed time has elapsed after the stop of the text-to-speech process is detected first (S39). Elapsing of the fixed time is measured by use of a timer operation which starts counting from an initial value, in response to the display request flag cleared at Step S9, for example, as one of the time managing at Step S11. When the fixed time is exceeded, a timeout flag is set, and the operation of the timer concerned is stopped. At Step S39, when the set state of the timeout flag is detected, the flag concerned is cleared. Accordingly, it is possible to determine whether the state where the fixed time has been exceeded is detected first.

When the state where the fixed time has been exceeded is detected first, it is determined whether the speech speed mode is already the normal mode (S40). When the speech speed mode is not yet the normal mode, the speech speed mode data of the temporary register is changed to a slower value by one step (S41).

The speech speed mode data once set in the temporary register in the processing of Step S41, Step S54, and Step S52 is reflected in the speed history 6A of the nonvolatile memory 6 within the limit of the ten latest pieces at Step S37.

Figure 8:
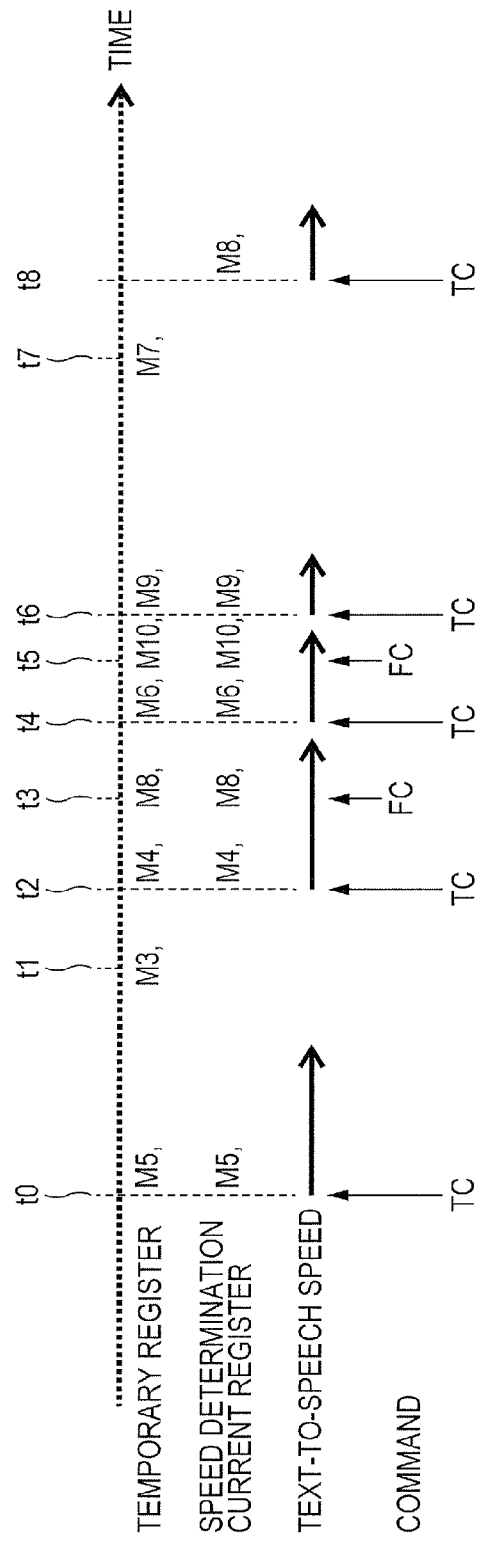
FIG. 8 is a timing chart illustrating the state of speed changes of text-to-speech operation according to a command input interval.

The timing chart of FIG. 8 illustrates the state of speed changes of text-to-speech operation according to a command input interval. It is assumed first that the speech speed mode data of the temporary register is M5. TC means a valid command in the menu operation and FC means an invalid command issued in the middle of the voice guidance of the menu item. It is assumed here that the speech history 6A holds four latest pieces of the speech speed mode data of the temporary register. It is also assumed that 1.5 times the weight is allotted to the latest data, in the operation of the speech speed by the weighted average using the entry data of the speed history 6A.

When there exists an input of a command TC at time t0, the speech speed is set as the speech speed mode data M5 calculated at Step S52, for example. The speech speed mode data M5 is set in the temporary register and the speed determination current register.

After the completion of the voice guidance instructed by the command TC inputted at time t0, a period when no command is inputted continues for a prescribed period. The progress is first detected at Step S39, and the speech speed mode data of the temporary register is changed to speech speed mode data M3 which is decreased by one step (time t1).

When a new command is inputted at time t2, the speech speed is set as speech speed mode data M4 calculated at Step S52, for example. The speech speed mode data M4 is set in the speed determination current register, and the speech speed after time t2 is controlled to the speed corresponding to the data M4. A command of a new menu operation is issued in the middle of this voice guidance (time t3). Although the instructions of the present command become invalid (S4), the speech speed mode data in the temporary register is increased to M8 by the processing of Step S54 through Step S57, and the speech speed is also increased to a proportionately faster one.

When a new command is inputted at time t4, the speech speed is set to M6 which is a weighted average of the speed history M8, M4, and M3. This speech speed is more increased compared with the speech speed at time t2. A command of a new menu operation is issued also in the middle of the present voice guidance (time t5). Although the instructions of the present command become invalid (S4), the speech speed mode data in the temporary register is increased to M10 by the processing of Step S54 through Step S57, and the speech speed is also increased to a proportionately faster one.

When a new command is inputted at time t6, the speech speed is set to M9 which is a weighted average of the speed history M10, M6, and M8. This speech speed is more increased compared with the speech speed at time t4. When the present voice guidance is completed, a command input will stop for a while. The progress is first detected at Step S39, and the speech speed mode data of the temporary register is changed to speech speed mode data M7 which is decreased by one step (time t7).

When a new command is inputted subsequently at time t8, the speech speed is set to M8 which is a weighted average of the speed history M7, M9, and M10. This speech speed is decreased compared with the speech speed at time t6. This is because switching of the next menu operation is expected to be delayed as long as the preceding long interval.

According to the present embodiment, the following operation-effects are produced.

Figure 9:
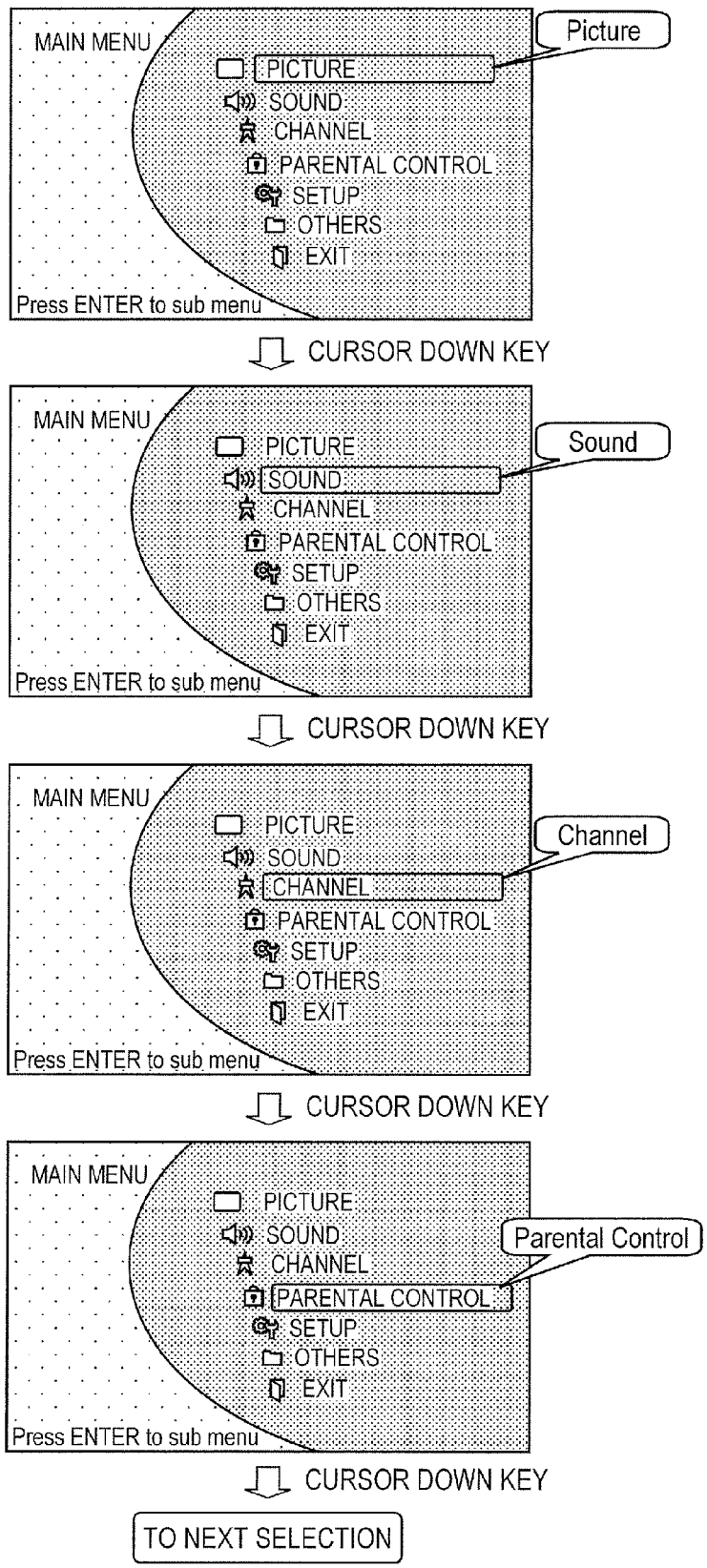
FIG. 9 is an explanatory diagram illustrating a state where all the textual information of a menu item can be read aloud, when a menu operation command is issued by moving a cursor down by a remote controller to change a menu item.
Figure 10:
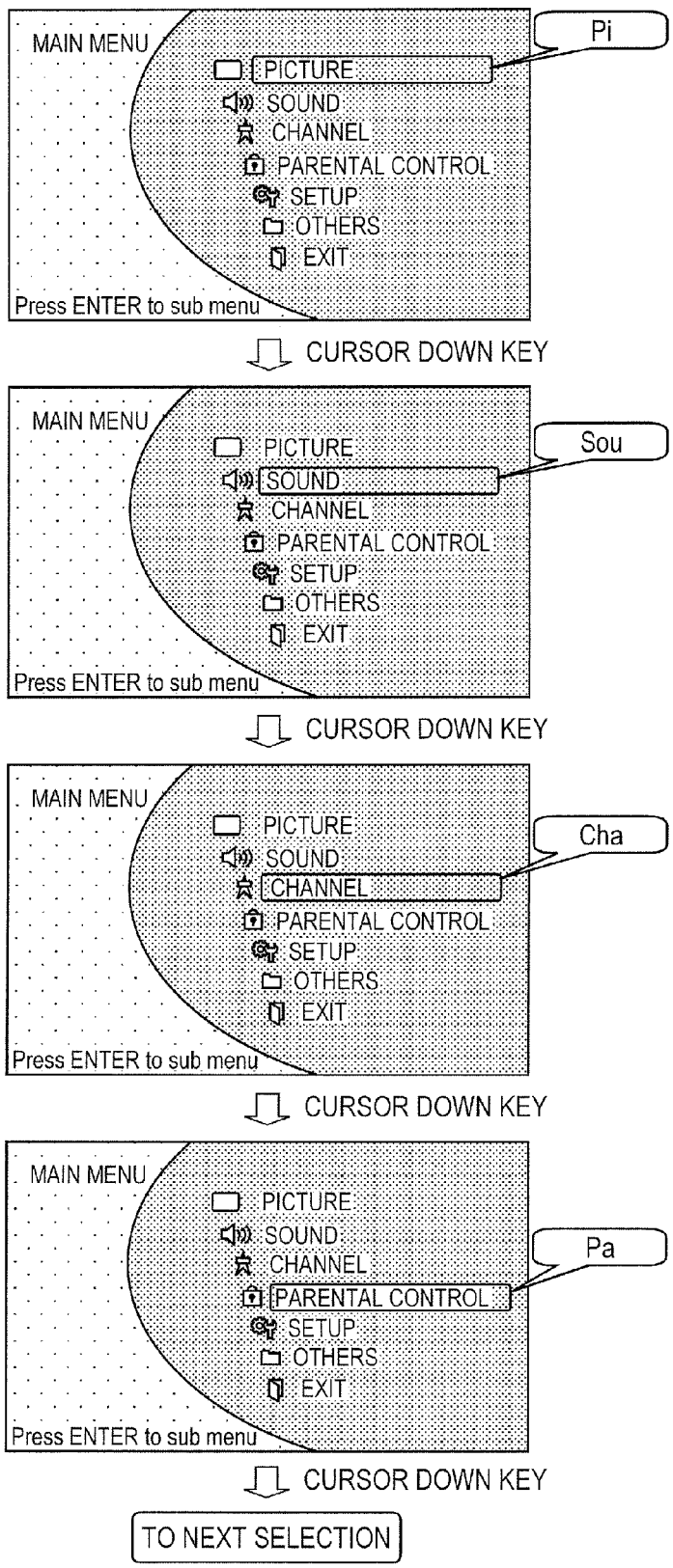
FIG. 10 is an explanatory diagram illustrating a state where voice guidance of the textual information of a menu item is left unfinished, when a menu operation command is issued by moving a cursor down by a remote controller to change a menu item.

(1) The voice guidance control unit 11 determines reproduction speed of the voice guidance according to the analysis result, on the basis of a speed trend obtained from a speed history 6A as a set of plural pieces of reproduction speed information (S52). According to the present device, the reproduction speed of the voice guidance is determined on the basis of the speed trend obtained from plural pieces of reproduction speed information held by the speed history 6A. Therefore, as explained with reference to FIG. 8, it is possible to reduce the influence of a trend of the change interval, a rapid change of the change interval, etc. of a menu operation, and it becomes easy to make the voice guidance follow such a change. Therefore, it is possible to perform the voice guidance by rapid talking (fast hearing voice) from the beginning when the change interval of the menu operation is frequently short. In operating an audio-video (AV) device etc., when a user always inputs a command continuously at short time intervals and the possibility of performing the voice guide in a fast hearing voice is high, it is possible to perform the voice guidance in a fast hearing voice from the beginning. In another example as illustrated in FIG. 9, when a menu operation command is issued by moving a cursor down by a remote controller to change a menu item, it is possible to read aloud all the textual information of the menu item, if the switching speed is within a range assumed to be normal. "Picture" shown in a dialogue balloon to the menu item "PICTURE" means the voice guidance. On the other hand, when the present invention is not applied and a change operation remarkably faster than the ordinary switching speed is performed, the voice guidance will be cut off right at the end whenever the switching is performed, as illustrated in FIG. 10. According to the present embodiment, it is possible to realize the voice guidance in the state as illustrated in FIG. 9, even when the switching speed is fast.

(2) When a new operation instruction of the menu item is issued in the middle of reproduction of the voice guidance, the voice guidance control unit 11 increases the reproduction speed in the middle of reproduction within the highest speed (S53-S58, S24-S31, T3b). That is, when a new operation instruction of the menu item is issued in the middle of reproduction of the voice guidance at the presently determined reproduction speed (S20, S50), the voice guidance control unit 11 updates speech speed mode data which determines the reproduction speed in the middle of reproduction to a value which increases the reproduction speed in the middle of reproduction by one step (S54). Furthermore, when a mean value of the request interval is obtained from a request interval history as a set of the interval time at which the voice guidance of the menu item has been requested by an operation instruction signal of the menu item, and when the mean value of the request interval is shorter than the remaining time of the voice guidance in the middle of reproduction, the speech speed mode data is updated to a value which increases the reproduction speed by one more step (S54-S57, S58). The updating of the speech speed mode data is performed to the temporary register. Together with this, when the value of the temporary register concerned means a high speed compared with the value of the speed determination current register, the speech speed is increased in the middle of the voice guidance so that the speech speed instructed by the speech speed mode data of the temporary register concerned may be satisfied (S25-S31).

According to the present device, when a new operation instruction of the menu item is issued, it is possible to increase promptly the reproduction speed even in the middle of the voice guidance. Therefore, it is possible to realize the speed increase prior to the speed increase of the next voice guidance by the speed history. In particular, when the change operation of the menu item is frequently performed during the voice guidance, even if the voice guidance concerned is completed, it is expected that the change operation of the menu item is performed at a similarly short interval. According to the present device, however, it is possible to cope with such a case. This is because, even if the change operation of the menu item is frequently performed at a short interval during the voice guidance, the operation trend is added to the speed history. If it is assumed that each request interval time of the request interval history becomes shorter in particular, due to the operation instruction of a new menu item issued repeatedly at a short interval in the middle of the text-to-speech process, the present text-to-speech process cannot be completed within a mean time of the request interval concerned when the mean value of the request interval time is shorter than the remaining reproduction time. Accordingly, it is possible to cope with the increase of the next speech speed, by updating the speech speed mode data to a fast speed trend towards further speed enhancement.

(3) When a new operation instruction of the menu item is issued in the middle of reproduction of the voice guidance, the voice guidance control unit 11 is assured to add the increased reproduction speed information to the speed history (S37). In this way, the increased reproduction speed information is added to the speed history corresponding to an operating condition in which the menu item has been changed quickly rather than immediately before. Accordingly, it is possible to reflect the fast changing trend of the menu item to the determination of the next reproduction speed.

(4) When the period during which the voice guidance of the menu item is stopped exceeds a prescribed period, the voice guidance control unit 11 enables addition of decreased reproduction speed information to the speed history (S39-S41, S37). According to the present device, the decreased reproduction speed information is added to the speed history corresponding to the state where there is no operation of the menu item for a certain time. Accordingly, it is possible to reflect the slow changing trend of the menu item to the determination of the next reproduction speed.

(5) When determining the speech speed in response to an operation instruction of the menu item, the voice guidance control unit 11 determines the reproduction speed of the present voice guidance by a weighted average which allots larger weight to new reproduction speed information rather than old reproduction speed information of the speed history 6A (S52). Therefore, it is possible to determine the reproduction speed of the voice guidance by attaching importance to the speed trend of the latest menu operation, and it is possible to perform the voice guidance without deviating from the trend of the latest menu operation, suppressing an extreme change of the voice guidance speed.

(6) When a new operation instruction of the menu item is issued in the middle of reproduction of the voice guidance at the presently determined reproduction speed, the voice guidance control unit 11 invalidates the request of the new operation instruction concerned (S53, S2, S4). Therefore it is possible to ignore the invalidated operation instruction; accordingly, the control of the voice guidance becomes simple on the whole.

(7) The reproduction speed information to be stored in the speed history 6A, the temporary register, etc. is the speech speed mode data. Therefore, the management of the speed history becomes easier by employing the speech speed mode data as the reproduction speed information rather than employing the reproduction speed itself. This is because a necessary speech speed can be assigned to each of the mode data.

(8) The voice guidance control unit 11 analyzes the voice data at a reference speed which is employed for the voice guidance of the menu item according to the analysis result of the operation instruction signal, grasps a repeated waveform portion (S61), and generates the voice data to be employed for the voice guidance, by omitting the repeated waveform portion by the necessary amount to satisfy the presently determined reproduction speed (S63). According to the present device, the speech frequency does not change depending on the reproduction speed; accordingly, it is easy to realize favorable sound quality, compared with the case where the reproduction data is prepared by compressing and decompressing the entire voice data according to speed. What is necessary is just to prepare the reference speed voice data, and it is not necessary to hold the voice data for every voice reproduction speed.

Pursuant to the above, when a new operation instruction of the menu item is issued in the middle of reproduction of the voice guidance, the voice guidance control unit increases the reproduction speed from the middle of the menu item under reproduction, by changing a portion of the subsequent reproduction to voice data in which the repeated waveform portion is furthermore omitted (S24-S31, T3b). According to the present device, it is possible to promptly increase the reproduction speed even in the middle of the voice guidance when a new operation instruction of a menu item is issued. Therefore, it is possible to realize the speed increase prior to the speed increase of the next voice guidance by the speed history.

The compression of the voice data is not restricted above, but it is possible to realize the same operation as illustrated in FIG. 11 through the increase of the reproduction speed by increasing the reproduction frequency of a part or all of the voice data. For example, it is possible to realize the same operation by shortening the DMA transfer cycle of the voice data. Similarly, when the reproduction frequency is further increased from the middle of the voice guidance, it is possible to apply to the case of further increasing the reproduction speed in the middle of the voice guidance.

(9) The voice guidance control unit 11 holds the reference speed voice data in the auxiliary memory 7 for individual voice guidance, and acquires the reference speed voice data employed for the analysis from the storage device. According to the present device, it is not necessary to acquire the reference speed voice data from the exterior.

(10) The textual guidance control unit 12 switches the Display to the corresponding menu item in synchronization with completion of the voice guidance. Therefore, it is possible to easily prevent the occurrence of a discrepancy between the voice guidance and the menu display. Even in the fast change operation of the menu item, switching of the menu display is performed only after the once-started voice guidance is completed without interruptions.

It cannot be overemphasized that the present invention is not restricted to the embodiment, and it can be changed variously in the range which does not deviate from the gist.

For example, it is preferable to prepare several kinds of voice data with different speeds beforehand, and to select voice data corresponding to a necessary speech speed, thereby enabling to change the speech speed. As the method to change the speech speed, there are a method to omit a part of the repeated waveform as explained in the present embodiment, a method to increase the speech frequency, and a method to employ both methods in an intermingled manner.

The operation instruction of a menu item is not restricted to the case of supplying from a remote controller. It may be inputted from a control panel, etc. provided in one with the device.

The embodiment is not restricted to application to a television set, AV equipment, and a car navigation device. It can be widely applied to the electronic equipment in which sound reproduction and a display are practicable.

The procedures explained in FIG. 2 through FIG. 6 are an example, and can be changed suitably.

What is claimed is:

1. A voice guidance system comprising:

an input analyzing unit operable to an input and to analyze an operation instruction signal of a menu item;

a voice guidance control unit operable to control voice guidance of the menu item according to an analysis result by the input analyzing unit; and a display guidance controller operable to perform display control of the menu item according to the analysis result by the input analyzing unit, wherein the voice guidance control unit determines reproduction speed of the voice guidance according to the analysis result, based on a speed trend obtained from a speed history as a set of plural pieces of reproduction speed information, and wherein the voice guidance control unit determines the reproduction speed of voice guidance by a weighted average, which allots larger weight to new reproduction speed information rather than old reproduction speed information, in adding to the speed history.

2. The voice guidance system according to claim 1, wherein, when a new operation instruction of the menu item is issued in a middle of reproduction of the voice guidance, the voice guidance control unit increases the reproduction speed in the middle of reproduction within a highest speed.

3. The voice guidance system according to claim 2, wherein, when a new operation instruction of the menu item is issued in a middle of reproduction of the voice guidance, the voice guidance control unit enables addition of increased reproduction speed information to the speed history.

4. The voice guidance system according to claim 3, wherein, when a period during which the voice guidance of the menu item is stopped exceeds a prescribed period, the voice guidance control unit enables addition of decreased reproduction speed information to the speed history.

5. The voice guidance system according to claim 1, wherein, when a new operation instruction of the menu item is issued in a middle of reproduction of the voice guidance at the determined reproduction speed, the voice guidance control unit invalidates a request corresponding to the new operation instruction.

6. The voice guidance system according to claim 1, wherein the voice guidance control unit:

analyzes the voice data at a reference speed that is employed for the voice guidance of the menu item according to the analysis result by the input analyzing unit, determines a repeated waveform portion of the voice data, and generates new voice data to be employed for the voice guidance by omitting the repeated waveform portion by an amount to achieve the determined reproduction speed.

7. The voice guidance system according to claim 6, wherein, when a new operation instruction of the menu item is issued in a middle of reproduction of the voice guidance, the voice guidance control unit increases the reproduction speed from a middle of the menu item under reproduction, by changing a portion of the subsequent reproduction to voice data in which the repeated waveform portion has been omitted.

8. The voice guidance system according to claim 7, wherein the voice guidance control unit stores the voice data at the reference speed in a storage device for the voice guidance, and acquires the voice data at the reference speed employed for the analysis thereof from the storage device.

9. The voice guidance system according to claim 1, wherein the display guidance controller switches the display to the corresponding menu item in synchronization with completion of the voice guidance.

10. A voice guidance system comprising:

an input analyzing unit operable to analyze an operation instruction signal of a menu item;

a voice guidance control unit operable to control voice guidance of the menu item according to an analysis result by the input analyzing unit; and a display guidance controller operable to perform display control of the menu item according to the analysis result by the input analyzing unit, wherein the voice guidance control unit determines reproduction speed of the voice guidance according to the analysis result, based on a speed trend obtained from a speed history as a set of plural pieces of reproduction speed information, wherein, when a new operation instruction of the menu item is issued in a middle of reproduction of the voice guidance, the voice guidance control unit increases the reproduction speed in the middle of reproduction within a highest speed, wherein, when a new operation instruction of the menu item is issued in the middle of reproduction of the voice guidance at a presently determined reproduction speed, the voice guidance control unit updates speech speed mode data, which determines the reproduction speed, in the middle of reproduction to a value which increases the reproduction speed in the middle of reproduction by one step, and at a same time, when a mean value of the request interval, which is obtained from a request interval history as a set of interval times at which the voice guidance of the menu item has been requested by an operation instruction signal of the menu item, is shorter than a remaining time of the voice guidance in the middle of reproduction, the voice guidance control unit increases the reproduction speed in the middle of reproduction within the highest speed by processing to update the speech speed mode data to a value that increases the reproduction speed by one additional step.

11. The voice guidance system according to claim 10, wherein the reproduction speed information to be stored in the speed history is the speech speed mode data.

12. The voice guidance system according to claim 10, wherein, when a period during which the voice guidance of the menu item is stopped exceeds a prescribed period, the voice guidance control unit adds, to the speed history, reproduction speed information that indicates a reproduction speed less than that of an immediately preceding reproduction speed and greater than a reference speed, on condition that the immediately preceding reproduction speed is greater than the reference speed.

13. The voice guidance system according to claim 12, wherein the reproduction speed information to be stored in the speed history is the speech speed mode data which determines the reproduction speed.

14. Electronic equipment comprising:
a control device operable to an input of an operation instruction from an operating device and to respond to the operation instruction;
a display device operable to an input of a picture signal outputted from the control device; and
a speaker device operable to an input of an audio signal outputted from the control device,
wherein the control device comprises:
an input analyzing unit operable to input and to analyze an operation instruction signal of a menu item from the operating device;
a voice guidance control unit operable to perform voice guidance of the menu item in accordance with the operation instruction using the speaker device, based on the analysis result by the input analyzing unit;
a display guidance controller operable to display the menu item in accordance with the operation instruction using the display device, based on the analysis result by the input analyzing unit; and
an execution control unit operable to perform processing of the menu item instructed by the operation instruction, based on the analysis result by the input analyzing unit, and
wherein the voice guidance control unit determines reproduction speed of the voice guidance according to the analysis result, based on a speed trend obtained from a speed history as a set of plural pieces of reproduction speed information,
wherein, when a new operation instruction of the menu item is issued in a middle of reproduction of the voice guidance at a presently determined reproduction speed, the voice guidance control unit updates speech speed mode data, which determines the reproduction speed, in the middle of reproduction to a value which increases the reproduction speed in the middle of reproduction by one step, and at a same time, when a mean value of the request interval, which is obtained from a request interval history as a set of interval times at which the voice guidance of the menu item has been requested by an operation instruction signal of the menu item, is shorter than a remaining time of the voice guidance in the middle of reproduction, the voice guidance control unit increases the reproduction speed in the middle of reproduction within a highest speed, by processing to update the speech speed mode data to a value that increases the reproduction speed by one additional step.

15. The electronic equipment according to claim 14, wherein, when a new operation instruction of the menu item is issued in the middle of reproduction of the voice guidance, the voice guidance control unit enables addition of the increased reproduction speed information to the speed history.

16. The electronic equipment according to claim 15, wherein, when a period during which the voice guidance of the menu item is stopped exceeds a prescribed period, the voice guidance control unit enables addition of decreased reproduction speed information to the speed history.

17. The electronic equipment according to claim 14, wherein, when a period during which the voice guidance of the menu item is stopped exceeds a prescribed period, the voice guidance control unit adds, to the speed history, reproduction speed information that indicates a reproduction speed less than that of an immediately preceding reproduction speed and greater than a reference speed, on condition that the immediately preceding reproduction speed is greater than the reference speed.

\* \* \* \* \*